May 8, 1934.  D. O. SAYRE  1,957,673
TEAT DILATOR
Filed Nov. 4, 1930  2 Sheets-Sheet 1
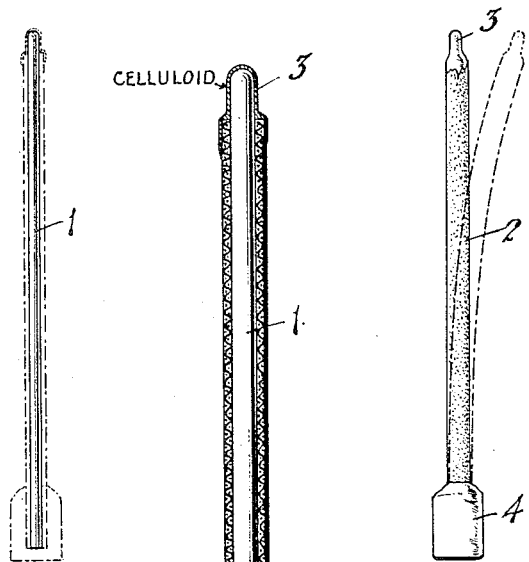
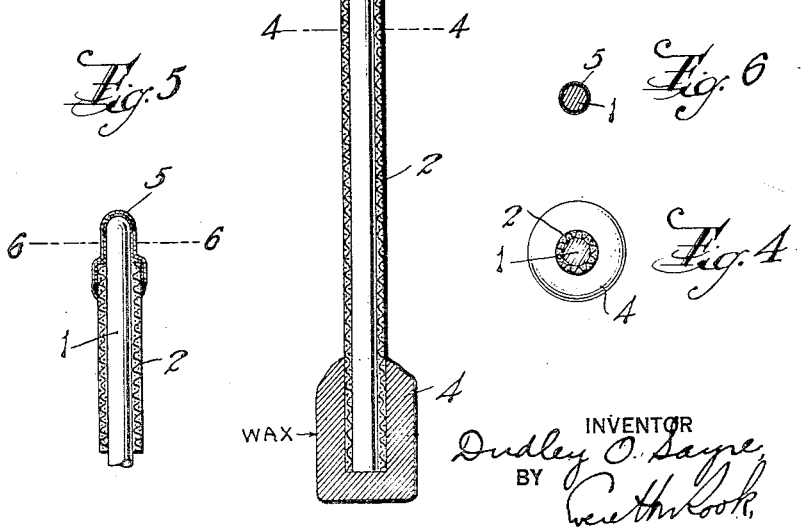

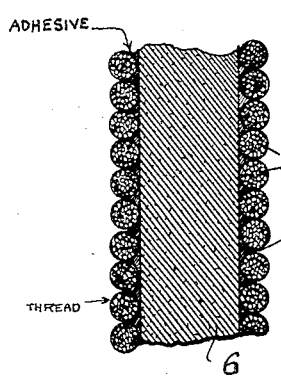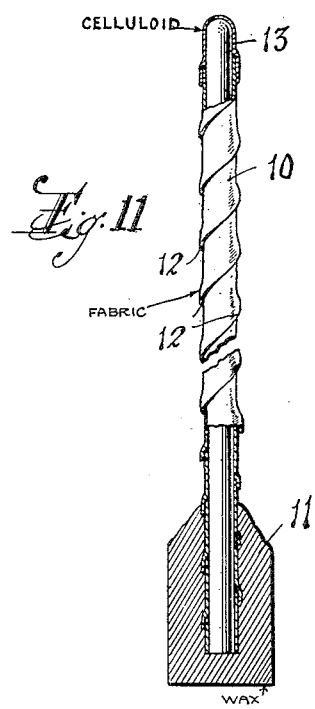

Patented May 8, 1934

1,957,673

UNITED STATES PATENT OFFICE 1,957,673

TEAT DILATOR

Dudley O. Sayre, Montclair, N. J.

Application November 4, 1930, Serial No. 493,298

7 Claims. (Cl. 128—341)

This invention relates particularly to a dilator for cows' teats the milk ducts of which have obstructions or some other abnormalities or injuries which render it difficult to milk the cow; and especially the invention relates to medicament applicators for teats.

Some known dilators, plugs or applicators include a metallic wire core or body having thereon fiber strands impregnated with a medicine or antiseptic, and such dilators are objectionable in that the metal core or body is so stiff and hard as to itself injure the teat, and also becomes corroded. Another type of dilator includes a core of some animal fiber, for example rawhide, or whalebone, which is coated with an antiseptic or medicated substance; and these dilators are objectionable in that the coating dissolves and reduces the size of the dilator so that the dilator soon falls from the teat.

One object of my invention is to provide a dilator or applicator of the character described embodying novel and improved features of construction whereby the dilator shall have the desirable flexibility and hardness, and the capability of retaining a medicated substance, and also be easily and securely retained in the milk duct.

Another object is to provide a teat dilator having a core of vegetable fiber, for example, reed, covered or sheathed with an absorbent material, such as tubular woven fabric, to contain a medicine or antiseptic solution.

Other objects are to provide such a dilator including a novel and improved construction for securing the absorbent covering upon the core; to provide a novel and improved form of entering tip for teat dilators, and to obtain other advantages and results as will be brought out by the following description.

Referring to the accompanying drawings in which corresponding and like parts are designated by the same reference characters, Figure 1 is a side elevation of a teat dilator embodying my invention.

Figure 2 is a similar view of the core.

Figure 3 is an enlarged longitudinal sectional view through the dilator.

Figure 4 is a horizontal sectional view on the line 4—4 of Figure 3.

Figure 5 is a fragmentary sectional view of the entering end of the dilator, showing a modification of the invention.

Figure 6 is a horizontal sectional view on the line 6—6 of Figure 5.

Figure 7 is a side elevation partially in section of a modified form of dilator.

Figure 8 is an enlarged fragmentary transverse vertical sectional view through the dilator shown in Figure 7.

Figure 9 is a side elevation of another modified form of the dilator.

Figure 10 is a fragmentary vertical sectional view therethrough.

Figure 11 is a side elevation of another type of dilator, and

Figure 12 is a transverse vertical sectional view of the dilator shown in Figure 7.

Specifically describing the embodiment of the invention illustrated in Figures 1 to 4 inclusive, the reference character 1 designates a straight cylindrical core formed of any suitable non-corrosive material having flexibility and sufficient hardness to retain its shape under pressure, for example, a rubber composition, celluloid, or a vegetable fiber, such as reed. Nicely fitted upon and enclosing the core 1 is an absorbent sheath like covering 2 which is preferably in the form of a tubular woven fabric telescopically fitted upon the core. This cover 2 is impregnated with a suitable medicament or solution having antiseptic or healing properties, such as a solution of carbolic acid in melted beeswax. Where the core 1 is formed of material having moisture absorbing qualities, the core may be treated with a substance, for example, varnish, shellac, or liquid glass to render the core waterproof and prevent absorption of the medicament or other moisture by the core so as to obviate swelling of the core which might cause injury to a teat.

One end of the covering 2 is secured to the core 1 inwardly of the extremity of the core by a suitable cement, adhesive, or binder medium 3, for example, liquid glass, by dipping the end of the core and the covering into the adhesive solution. At the other end, the dilator has secured thereto a finger-piece 4 for manipulating the dilator and also to limit insertion of the dilator into the teat. This finger-piece may be formed of any suitable material, preferably a plastic substance, such as a mixture of beeswax and coloring matter. The finger-piece entirely encloses the corresponding end of the core 1 and covering 2 so as to secure the core and covering together.

It is desirable to also provide the entering end of the dilator with a suitable coating to form a smooth surface so as to prevent injury to the milk duct as the dilator is inserted, and for this purpose I may apply a coating 5 of collodion or like binder medium over the liquid glass or adhesive by dipping the end of the dilator into a solution of collodion or the like. Preferably this solution is moisture-proof, as indicated, so as to enable the dilator to be withdrawn and inserted repeatedly without dislocation of the fabric covering, and may be used as an adhesive itself. Also the end 4 may be dipped in a solution of celluloid to provide a smooth finish if desired.

Figure 7 shows a modified form of dilator in which the core sheath 6 has helically wound thereon an absorbent thread 7 composed of textile fibers such as yarn to form a covering or sheath. The thread may be secured on the core by a suitable adhesive 8.

Instead of the helically wound thread, I may utilize a strip 9 of absorbent fabric helically wound upon the core, as shown in Figure 9, with the edges of the various convolutions in the same plane or in abutting relation.

To facilitate in holding the dilator in the duct, a strip 10 of absorbent material may be helically wound on the core with the edges facing the finger-piece 11 arranged in overlapping relation to the other edges 12 of the strip, as shown in Figure 11. These edges 12 project from the surface of the dilator so as to restrain slipping of the dilator from the duct.

In both forms of the invention the strips 9 and 10 of absorbent material may be secured on the core with a suitable adhesive which extends the full length of the core, although it is possible to secure the strips on the cores by merely fastening the ends of the strips with an adhesive or the equivalent thereof. The coverings 7, 9 and 10 may be impregnated with a suitable medicament, as is the cover 2; and the dilators shown in Figures 7, 9 and 11 may have teat entering tips 13 and finger pieces 11 corresponding to the tip 3 and finger-piece 4 of the construction shown in Figures 1 to 5 inclusive.

A dilator constructed in accordance with the invention is sufficiently hard to be self-sustaining in the teat and has adequate resiliency or flexibility to prevent injury to the teat. Also, the covering will effectively absorb a medicament and the medicament may dissolve in the teat without in any manner affecting the retention of the dilator in the teat. Furthermore, the end of the fabric covering terminating short of the extremity of the core with the smooth coating of the liquid glass or celluloid, provides a reduced entering tip to facilitate inserting of the dilator.

Obviously the construction of the dilator may be modified and changed, and different compositions for the entering tip and for the finger-piece 4 may be utilized, and any suitable medicaments may be employed, without departing from the spirit or scope of the invention. Therefore, I do not wish to be understood as limiting myself in the construction of the dilator except as required by the following claims when construed in the light of the prior art.

Having thus described my invention, what I claim is:

1. A teat dilator comprising a cylindrical core having a covering composed of a strip of absorbent material helically wound upon said core and secured thereto, one edge of said strip overlapping the other edge and the first-mentioned edge facing in the direction away from the teat-entering end of the dilator.

2. A teat dilator comprising a core formed of an elongated flexible piece of reed of substantially uniform cross-sectional area throughout its length having an absorbent covering composed of a length of tubular woven fabric one end of which terminates short of the corresponding extremity of the core, and a coating of a binder medium overlying said extremity of the core and said end of the covering to secure the covering to the core and provide a smooth teat-entering tip for the dilator.

3. A teat dilator comprising an elongated flexible cylindrical core substantially uniform in cross-sectional area throughout its length having an absorbent covering one end of which terminates short of the corresponding extremity of the core, a coating of a binder medium overlying said extremity of the core and said end of the covering to secure the covering to the core and provide a reduced teat-entering tip for the dilator, and a wax-like finger-piece overlying the other end of said core and the corresponding end of said covering to hold the covering on the core and limit insertion of the dilator into a teat.

4. A teat dilator comprising a core formed of an elongated flexible piece of reed having an absorbent covering composed of a length of tubular woven fabric both ends of which terminate adjacent the corresponding extremities of the core, a coating of binder medium overlying one extremity of the core and the corresponding end of the covering to secure the covering to the core and provide a smooth teat entering tip on the dilator, and a finger-piece overlying the other end of the core and the corresponding end of the covering to hold the covering on the core and limit insertion of the dilator into a teat.

5. A teat dilator comprising an elongated flexible cylindrical core having an absorbent sheath-like covering one end of which terminates adjacent the corresponding extremity of the core, a finger-piece of plastic material enclosing said end of said core and the corresponding end of said covering to hold the covering on the core and limit insertion of the dilator into a teat, and means at the other end of the core and covering providing a smooth teat-entering tip.

6. A teat dilator comprising an elongated core of flexible reed having a length of tubular woven fabric telescoped thereover and secured thereon against removal to form a covering.

7. A teat dilator comprising an elongated flexible cylindrical core and a covering composed of a length of absorbent tubular woven fabric telescoped on the core and secured thereon against removal.

DUDLEY O. SAYRE.